US008290858B1

(12) United States Patent
Ankarath

(10) Patent No.: US 8,290,858 B1
(45) Date of Patent: Oct. 16, 2012

(54) METHOD FOR ISSUING AND MANAGING DEBIT GIFT CARDS

(76) Inventor: Madhu Ankarath, Decatur, GA (US)

( * ) Notice: Subject to any disclaimer, the term of this patent is extended or adjusted under 35 U.S.C. 154(b) by 223 days.

(21) Appl. No.: 12/055,872

(22) Filed: Mar. 26, 2008

Related U.S. Application Data

(60) Provisional application No. 60/908,033, filed on Mar. 26, 2007.

(51) Int. Cl.
*G06Q 40/00* (2012.01)

(52) U.S. Cl. .................................... 705/39; 705/35

(58) Field of Classification Search .................. 705/35, 705/39

See application file for complete search history.

(56) References Cited

U.S. PATENT DOCUMENTS

| | | | |
|---|---|---|---|
| 5,864,830 A | 1/1999 | Armetta | |
| 5,963,647 A * | 10/1999 | Downing et al. | 705/39 |
| 5,984,180 A * | 11/1999 | Albrecht | 235/380 |
| 6,182,895 B1 * | 2/2001 | Albrecht | 235/380 |
| 6,240,397 B1 * | 5/2001 | Sachs | 705/26.1 |
| 6,827,261 B2 | 12/2004 | Abe et al. | |
| 7,204,412 B2 * | 4/2007 | Foss, Jr. | 235/380 |
| 7,337,947 B1 * | 3/2008 | Swanson, Sr. | 235/375 |
| 2001/0051876 A1 * | 12/2001 | Seigel et al. | 705/1 |
| 2002/0026420 A1 | 2/2002 | DuPhily | |
| 2002/0143703 A1 | 10/2002 | Razvan | |
| 2004/0099730 A1 * | 5/2004 | Tuchler et al. | 235/380 |
| 2004/0159701 A1 | 8/2004 | Abe et al. | |
| 2004/0249748 A1 * | 12/2004 | Schultz et al. | 705/39 |
| 2005/0098624 A1 * | 5/2005 | Foss | 235/380 |
| 2005/0108121 A1 * | 5/2005 | Gravett et al. | 705/35 |
| 2005/0199712 A1 * | 9/2005 | Rosenblatt | 235/381 |
| 2006/0091202 A1 | 5/2006 | McInnis | |
| 2006/0095338 A1 | 5/2006 | Seidel | |
| 2006/0173780 A1 | 8/2006 | Cline | |
| 2006/0207856 A1 | 9/2006 | Dean | |
| 2007/0108275 A1 * | 5/2007 | Shuster | 235/383 |
| 2008/0223920 A9 * | 9/2008 | Duke | 235/380 |
| 2008/0235122 A1 * | 9/2008 | Weitzman | 705/35 |
| 2008/0301044 A1 * | 12/2008 | Vardi | 705/39 |

FOREIGN PATENT DOCUMENTS

| | | | |
|---|---|---|---|
| WO | WO 00/70517 | * | 11/2000 |
| WO | WO 02/05195 | * | 1/2002 |

* cited by examiner

*Primary Examiner* — Sarah Monfeldt

(74) *Attorney, Agent, or Firm* — Smith, Gambrell & Russell

(57) ABSTRACT

A method for issuing and managing debit gift cards and facilitating the processing of gift card payments through a debit process. The method involves associating a gift card with a purchaser and transferring any unused residual balance to the purchaser following card expiration or other triggering event.

2 Claims, 5 Drawing Sheets

METHOD FOR ISSUING AND MANAGING DEBIT GIFT CARDS

CROSS-REFERENCE TO RELATED APPLICATIONS

This application claims priority to U.S. provisional application No. 60/908,033, filed Mar. 26, 2007, which is incorporated herein by reference.

BACKGROUND OF THE INVENTION

The invention relates to a method for issuing and managing debit gift cards.

Consumer purchases of gift cards have increased dramatically in recent years. Gift cards allow the purchaser ("giftor") a quick and easy way to select a gift without the difficulty of determining exactly what gift the recipient ("giftee") would enjoy. Gift card recipients often like the flexibility of a gift card where the recipient can choose what particular good or service to purchase. A gift card is small and lightweight and can be sent easily through the mail. It can also have added security features such as a personal identification number (PIN) that minimize losses due to theft, loss, or unauthorized use. Unlike cash, some gift cards can be re-issued if they are lost or stolen.

A gift card can also seem less impersonal than money. Unlike a cash gift where the giftee could choose to save the money in a bank account or apply the money to a pre-existing expense, a gift card forces the gift recipient to purchase a new item, often from a particular merchant. By purchasing a gift card redeemable only from a particular merchant (or group of merchants), the giftor can choose a specific class of goods or brand of store, thus maintaining some of the traditional gift-giving experience. Furthermore, gift cards are often adorned with colorful logos, designs, or photographs that provide a more tailored and memorable gift experience than cash, checks, or other standard financial instruments. In comparison to paper gift certificates, the tangible qualities of today's plastic gift cards (such as their durability and their similarity in size, shape, and ease-of-use to credit cards) provide additional appeal.

Current gift cards have some significant drawbacks, however. Most importantly, many of today's gift cards are never used by the gift recipient. This is often because the recipient is too busy to use the card, misplaces or forgets about the card, or cannot find an item towards which he or she wishes to apply the card. Likewise, some gift card recipients only use a portion of the value stored on a gift card. While unused gift cards are profitable to the merchants who sell them, they represent lost value to the giftor and giftee.

Another drawback of today's gift cards is that the giftor immediately loses title to the funds used to purchase a gift card, yet the giftee may not actually use the card for many months (or even years). During that time, neither the giftor nor giftee can earn interest on the money represented by the gift card. Furthermore, the giftor has no legal right to, or control over, the value represented by a conventional gift card. If a conventional gift card issuing merchant has financial difficulties, goes bankrupt, or goes out of business, the giftee may not be able to use the gift card and the giftor may be unable to obtain a refund.

Gift cards today are usually not refundable or redeemable for cash by either the giftor or the giftee, even if the gift card reaches its expiration date or otherwise goes unused. While many giftors may not want a gift card to be redeemable for cash by the giftee, those giftors often would like to recoup the purchase price of unused, lost, or expired gift cards.

SUMMARY OF THE INVENTION

A method for issuing and managing debit gift cards that gives the giftor ownership rights and control over the value represented by the debit gift card is described herein. This is accomplished through the use of Gift Card Accounts ("GCAs") on which debit gift cards are drawn. A giftor maintains title to all the funds stored in his GCA(s). When a giftee uses a debit gift card to purchase a good or service, funds are debited from the associated GCA.

A giftor will open a new GCA for each debit gift card that he wishes to give to a giftee. For instance, if a giftor desires to give a debit gift card to four different people, he would open four different GCAs corresponding to those four debit gift cards. GCAs can be opened on a giftor's behalf by a "DGC Issuer" in a seamless transaction after a giftor requests the issuance of one or more debit gift cards. Each debit gift card is associated with one GCA and can draw funds on any balance in the associated GCA unless the debit gift card expires or is otherwise invalidated.

Unlike with conventional gift cards, the invention prevents the loss of funds if a debit gift card is lost, stolen, expired, or otherwise goes unused. That is, the giftor still has ownership of the funds stored in his GCA even if the associated debit gift card is lost, stolen, expired, or otherwise goes unused.

In some embodiments, the giftor can choose to direct all or a specified portion of an unused GCA balance to a third-party. Such third-parties could include charities, educational institutions, religious organizations, or civic groups. Such third-parties could also include an individual, group of individuals, or any other entity, including profit-making entities.

In some embodiments, a financial institution, gift card issuer, gift card sponsor, or some other entity is entitled to obtain a portion (up to and including 100%) of an unused GCA balance upon the gift card's expiration, loss, re-issuance, or other triggering event. For instance, a merchant issuing a debit gift card could, upon expiration of the gift card, charge a 5% fee on any remaining balance in the associated GCA. In another example, a church that sponsors or promotes a certain issuer's gift card could receive a flat fee up to 50 cents on any expired or re-issued gift card whose GCA carried a balance on the date of expiry or re-issuance.

Certain embodiments of the invention allow the giftor to earn interest on his GCAs. In some embodiments, a debit gift card can only be used at a particular merchant (or group of merchants). In other embodiments, the gift card can be used at any merchant participating in a common financial network (such as Visa, Mastercard, or American Express).

Some embodiments allow corporate users to obtain debit gift cards on behalf of the corporation. These gift cards could be given to employees, customers, vendors, or other persons or entities. A corporation might choose to give such gift cards as part of a sales promotion, buying incentive program, employee gift program, holiday gift program, or the like. The corporation would maintain ownership of all funds stored in its GCAs until they were spent. Furthermore, it could recoup any unused balance in its GCAs (less appropriate fees) after a triggering event. Similarly, other entities (government, non-profit organizations, associations, partnerships, etc.) could use such embodiments.

DETAILED DESCRIPTION OF THE PREFERRED EMBODIMENTS

Figure 1:
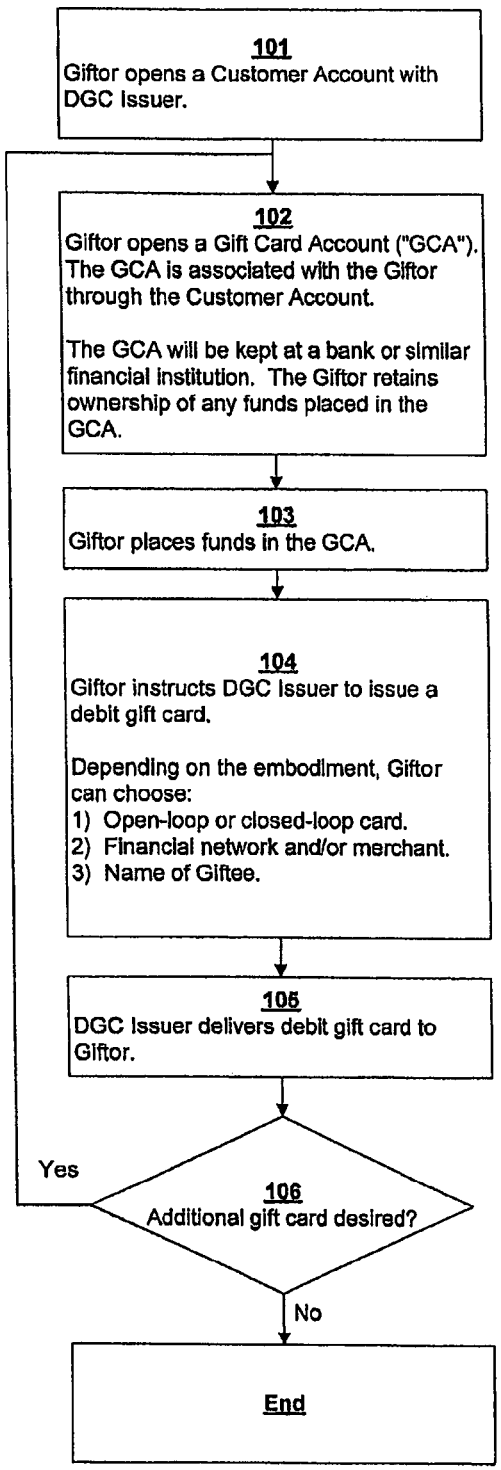
FIG. 1 is a flow diagram illustrating the issuance of a debit gift card directly by a DGC Issuer in one embodiment of the invention.

FIG. 1 is a flow diagram illustrating the issuance of a debit gift card directly by a "DGC Issuer" in one embodiment of the invention. A "DGC Issuer" is any company, entity, or person who maintains a "Customer Account". A "Customer Account" is a record containing the personal identification information of a giftor (customer). Such personal identification information typically includes the giftor's name and his contact information such as home address or a telephone number. In addition, such personal identification information can include a unique identifying number such as a social security number. In some embodiments, the DGC Issuer will assign a unique account number or other unique identifier to the giftor who opens a Customer Account.

In some embodiments, the DGC Issuer will be a bank or other financial institution that also maintains Gift Card Accounts.

In other embodiments, the DGC Issuer will not be a financial institution and will not maintain Gift Card Accounts. For example, the DGC Issuer could be a company whose core business is the issuance of debit gift cards. Alternatively, the DGC Issuer could issue gift cards as an ancillary part of its business (such as a concierge service in a hotel).

In certain embodiments, a non-financial merchant could maintain Customer Accounts and thus would be a DGC Issuer. Such a non-financial merchant would not maintain the Gift Card Accounts, however.

Figure 5:
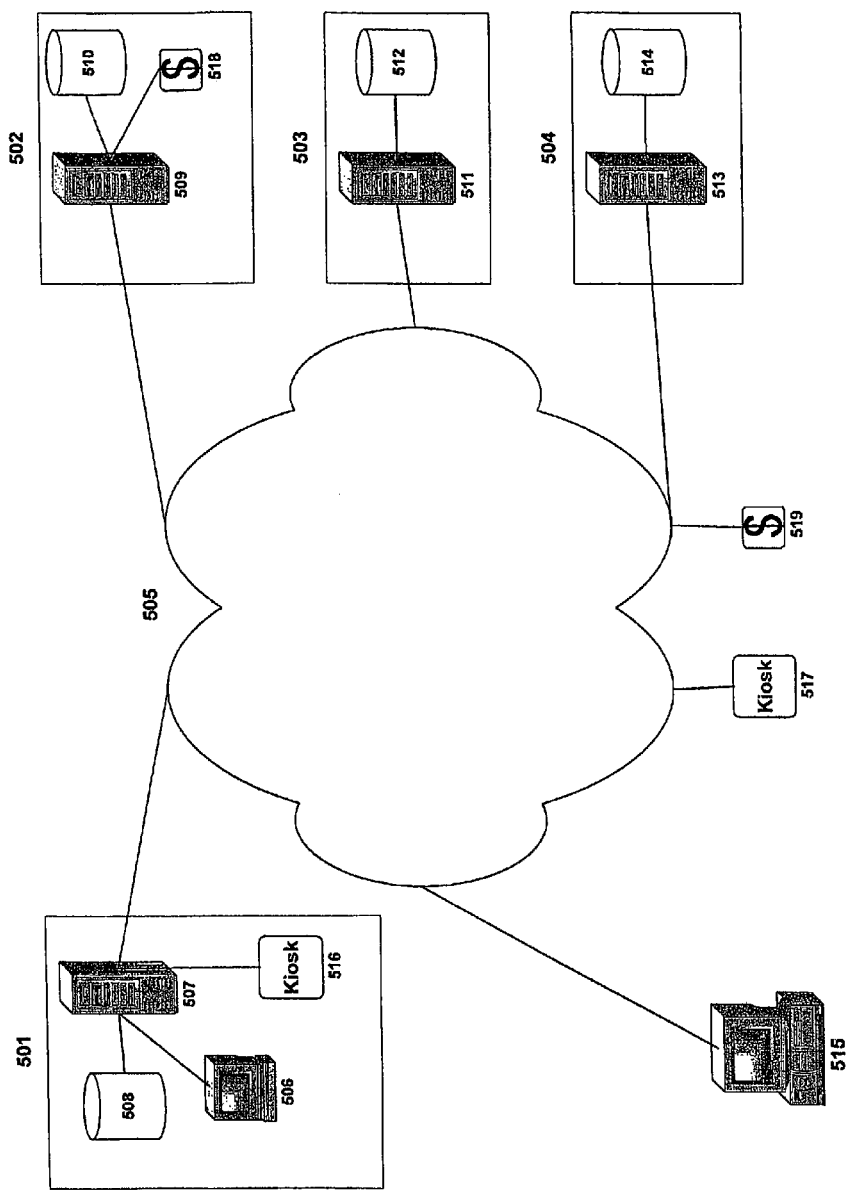
FIG. 5 is a diagram of a system in accordance with one embodiment of the invention.

With reference to FIGS. 1 and 5, a giftor could open a Customer Account with a DGC Issuer 501 at step 101. In this example, the DGC Issuer 501 is a non-financial company whose core business is the issuance of debit gift cards. As explained above, the DGC Issuer 501 will collect personal identification information from the giftor when the giftor opens a Customer Account. Such personal identification information will allow the DGC Issuer 501 to maintain a unique record of the giftor and to contact the giftor as needed. It will also allow the giftor to manage multiple debit gift cards and to link those gift cards (and their associated Gift Card Accounts) with the giftor.

A giftor could open such a Customer Account by walking into a store or office maintained by the DGC Issuer 501 and opening a Customer Account with a salesperson. Alternatively, the DGC Issuer 501 might maintain a self-service kiosk 516, automated teller machine ("ATM"), computer workstation, or similar such device inside its store or office. The giftor could then open a Customer Account with such a self-service device. In some embodiments, the giftor can open a Customer Account remotely by telephoning the DGC Issuer 501, accessing an internet site maintained by the DGC Issuer 501, or at a remote kiosk 517 or ATM location. In some embodiments, the giftor can open a Customer Account by fax, postal mail, or e-mail. For instance, the giftor could complete the appropriate paperwork and fax or mail it to the DGC Issuer 501.

Upon opening a Customer Account, the DGC Issuer 501 will keep a record of the giftor's personal identification information. Such information could be stored in a computer database 508. In other embodiments, the DGC Issuer 501 could maintain the Customer Accounts in a paper-based record system.

At step 102, the giftor will open a Gift Card Account ("GCA"). A GCA is a financial account which will store the money for a given debit gift card. Such a GCA will be held at a bank 502, 503, 504 or similar financial institution. Unlike with conventional gift cards, the giftor will maintain ownership over a GCA. That is, the funds that are present in a given GCA belong to the giftor who opened the account. In some embodiments, the giftor will earn interest over the funds stored in his GCA(s). As described more fully below, each GCA is associated with one debit gift card. If a giftor desires multiple gift cards, he must open multiple GCAs.

The giftor can open a GCA in multiple ways. He could walk into a bank branch office (502, e.g.) and open an account in person with a salesperson or at a self-service ATM 518 or kiosk. He could open a GCA with a bank remotely via telephone, an internet website, or a remote ATM 519. In some embodiments, the giftor can open a GCA by fax, postal mail, or e-mail. For instance, he could complete the appropriate paperwork and fax or mail it to the bank 502.

Alternatively, in some embodiments, the giftor can open a GCA while present at the store or office of a DGC Issuer 501. In such a case, the salesperson (or computer system) working for the DGC Issuer 501 would coordinate with a financial institution 502 to open a GCA at that particular financial institution 502. After completing the transaction, the giftor would have opened a GCA with the financial institution 502, even though he only dealt with employees of the DGC Issuer 501.

Similarly, a giftor might open an account remotely while dealing with employees (or computer systems) of the DGC Issuer 501. For instance, a giftor who, in step 101, had telephoned a DGC Issuer 501 and opened a Customer Account with a salesperson, could, in step 102, open a GCA while speaking to the same salesperson. The GCA would be maintained by a financial institution (502, e.g.) that had partnered with the DGC Issuer 501. In another example, a giftor could access the website of a DGC Issuer 501 and open a GCA (after having opened a Customer Account in step 101). The GCA would be maintained at a financial institution (502, e.g.).

Regardless of the method used to open the GCA, the DGC Issuer 501 must keep a record that links the giftor's Customer Account to the newly-opened GCA. Such a record could be kept in a database 508 maintained by the DGC Issuer 501. If the giftor opens a GCA by dealing with employees or computer systems of the DGC Issuer 501, then the DGC Issuer 501 will simply add a record to its database 508 during the process of opening the GCA at its partner bank (502, e.g.). If the giftor opens a GCA by dealing with employees or computer systems of the bank 502, then the bank 502 will need to communicate the account number (or other identifying information) about the GCA to the DGC Issuer 501. Such communications between the DGC Issuer 501 and its partner bank could be automated by computer systems.

This recordkeeping will allow the DGC Issuer 501 to keep track of all of the GCAs (and their associated gift cards) owned by a particular giftor. With this information, the DGC Issuer 501 can allow the giftor to manage all of his GCAs (and associated gift cards) in one place. Furthermore, the DGC Issuer 501 can facilitate the transfer of funds out of the GCAs upon gift card expiration (or other "triggering event"), as described more fully below. This recordkeeping will also allow the DGC Issuer 501 to assess fees or charges on the GCAs as described below.

At step 103, the giftor places funds in the GCA. This could be accomplished through a variety of means. If the giftor opens the GCA in person (at either the DGC Issuer 501 or at a financial institution 502, 503, 504), then he could fund his account by presenting cash, a check, credit or debit card, etc. He could also authorize an ACH transaction, wire transfer, or the like. The giftor could present similar forms of payment at a kiosk 517 or ATM 519. If the giftor opened an account remotely via telephone, fax, or a website, then most of these payment options would be acceptable except for cash or checks. Even cash and checks would be acceptable, in some embodiments, if the giftor mailed them or hand-delivered them to the DGC Issuer 501 or financial institution 502.

In some embodiments, the giftor can place any amount of funds in the GCA. For instance, a giftor could choose to place $77.77 in a GCA. In other embodiments, the giftor can only place certain dollar (or other currency) increments in the GCA. For example, a DGC Issuer 501 or financial institution 502 might restrict the giftor to placing only multiples of $10 (such as $10, $20, $30, etc.) into the GCA. In yet other embodiments, the giftor can only fund the GCA with certain denominations (such as $10, $25, $50, and $100).

At step 104, the giftor would instruct the DGC Issuer 501 to issue a debit gift card. In some embodiments the giftor can choose between an "open-loop" or a "closed-loop" debit gift card. In other embodiments, a given DGC Issuer 501 would only issue one type of card (either "open-loop" or "closed-loop").

An "open-loop" gift card is a gift card that can be used to purchase goods or services at any merchant that participates in a particular financial network. Examples of such financial networks include, but are not limited to, Visa, Mastercard, Discover, and American Express. In some embodiments, the giftor can choose which particular financial network he wants for his open-loop gift card. In other embodiments, the DGC Issuer 501 will only issue open-loop gift cards for a particular financial network.

Typically, open-loop gift cards would be embodied in plastic form similar to a credit or debit card and could be swiped through a point-of-sale ("POS") terminal. Alternatively, "virtual" open-loop gift cards could be embodied simply as an account number that is communicated to the giftor (or giftee). Like with a tangible open-loop gift card, such a "virtual" open-loop gift card account number could only be used at a merchant that had subscribed to the designated financial network.

A "closed-loop" gift card is a gift card that can only be used at a particular merchant or merchant chain. In some embodiments, the giftor can choose which particular merchant he wants for his closed-loop gift card. In other embodiments, the DGC Issuer 501 will only issue closed-loop gift cards for a particular merchant (or merchant chain).

Typically, a closed-loop gift card cannot be processed through a financial network such as Visa or Mastercard. In some embodiments, a closed-loop gift card can be processed through a financial network, but only at the particular merchant associated with the closed-loop gift card.

Like open-loop gift cards, closed-loop gift cards are typically embodied in plastic form and can be swiped through a POS terminal. A closed-loop gift card can be adorned with the logo of the compatible merchant to make the gift card look identical to today's conventional merchant gift cards. Alternatively, "virtual" closed-loop gift cards can be embodied in an account number that is communicated to the giftor (or giftee). Like with a tangible closed-loop gift card, such a "virtual" closed-loop gift card account number could only be used at the particular merchant (or merchant chain) associated with the gift card account number.

Each debit gift card will be associated with one GCA. Likewise, each GCA will only have one debit gift card associated with it. A giftee can use a debit gift card in a manner similar to today's bank debit cards. That is, when a giftee uses a debit gift card, funds will be debited from the corresponding GCA. The giftee can only debit the account up to the level of funds placed in the account in step 103. If the giftee has an open-loop gift card, he can use the gift card at any merchant in the participating financial network. If the giftee has a closed-loop gift card, then he can only use the gift card at the designated merchant (or merchant chain). A giftee can use a gift card so long as it has not expired or otherwise been invalidated following a "triggering event", as described more fully below.

In some embodiments, a debit gift card can bear the name of the intended giftee. The giftor would inform the DGC Issuer 501 of the giftee's name at the time of issuance so the DGC Issuer 501 could place the giftee's name on the debit gift card. This would provide added security and would help identify the gift card if it were misplaced by the giftee.

In some embodiments, the giftor could customize the gift card in other ways by adding photographs, text, and/or logos to the gift card. These could provide for a more memorable gift experience and also identify the giftor and/or giftee on the gift card. For instance, the giftor could place "From" and "To" lines on the gift card to indicate the gift-giver and the recipient.

In some embodiments, a debit gift card can be secured with a personal identification number (PIN). Such a PIN could be generated by the DGC Issuer 501 or chosen by the giftor (or giftee).

At step 105, the DGC Issuer 501 (or partnered financial institution 502, e.g.) would deliver the debit gift card to the giftor (or giftee). If the giftor, in step 104, ordered a gift card in person from a salesperson at a DGC Issuer 501 or bank 502, then the salesperson could simply hand the gift card to the giftor. Alternatively, if the giftor ordered a gift card from an ATM 518, 519 or kiosk 516, 517, then the machine could dispense the gift card to the giftor.

If the giftor ordered the gift card remotely (via telephone or the Internet, e.g.), then the gift card could be mailed to the giftor (or giftee) or held for pick-up at a "will-call" window at the DGC Issuer 501, bank 502, or at a particular merchant. If the giftor ordered a "virtual" gift card, the gift card account number could be communicated to him (or the giftee) by telephone, fax, internet, postal mail, e-mail, kiosk 516, 517, ATM 518, 519, "will-call" window, or verbally from a salesperson.

At step 106, the giftor can decide whether he wants to order another debit gift card. Since the giftor has already opened a Customer Account, he need not repeat step 101. The giftor can open a second or subsequent GCA at any time. That is, the Customer Account will remain open at the DGC Issuer 501 until it is closed by the giftor (or closed by the DGC Issuer 501 due to lack of activity or for other reasons). As long as the Customer Account is still open, the giftor can open more GCAs (and then order accompanying debit gift cards). So if the giftor only orders gift cards during the winter holiday period, for example, he can use the same Customer Account year after year to manage his GCAs (and attendant gift cards). This will allow the giftor, in some embodiments, to track the use of gift cards over the years and to keep a record of his past gifts.

In some embodiments, the giftor could open different GCAs at different banks or financial institutions. For example, a giftor, in step 102, could choose to open his first GCA at bank 502. Later, the giftor could decide to open a second GCA at bank 503. The DGC Issuer 501 would maintain a single Customer Account for the giftor and would have a record of the two different GCAs at banks 502 and 503. Thus, the giftor could manage his multiple GCAs (and attendant gift cards) through the DGC Issuer 501. In other embodiments, a given DGC Issuer 501 will have a preferred banking partner (502, e.g.) and will only allow its customers to open GCAs at that particular bank 502.

Those skilled in the art will recognize variations of the aforementioned steps for issuing debit gift cards. As mentioned above, for example, a financial institution could act as its own DGC Issuer by maintaining the Customer Account in addition to the GCAs. Such a Customer Account could simply be the information contained in another financial account at the bank. For instance, an existing bank customer having a checking account at a bank will have already provided his name, address, and social security number to the bank when he opened his checking account. The bank could choose to regard this checking account (and its associated personal identification information) as the Customer Account. The bank would then proceed to open GCA(s) and issue gift cards when requested to do so by its existing customer. Typically, banks would only offer open-loop gift cards compatible with a major financial network. In some cases, however, a bank might offer closed-loop gift cards for certain merchants.

In another example, a merchant could choose to act as its own DGC Issuer by partnering with a bank. In such a case, the merchant would maintain a record of the giftor's personal identification information in the Customer Account. For instance, the giftor could visit the "Customer Service" counter (or a kiosk) at a merchant and request the issuance of a debit gift card. In response, the customer service representative (or kiosk) could open a Customer Account, open a GCA (at a partner bank), fund the GCA, and issue a gift card all in one seamless process. Typically, such merchants would only offer closed-loop gift cards for use at that particular merchant (or merchant chain).

When opening and funding a GCA (as described in steps 102 and 103), the merchant would open a GCA in the giftor's name at a partner bank and transfer the giftor's deposited funds into the newly-opened GCA. As a result, the bank (or other financial institution)—not the merchant—would hold the GCA and the funds stored therein. The giftor would be the named owner of the GCA. Thus, even if the merchant were to go bankrupt, the giftor would still have ownership and control over the funds stored in the GCA. Furthermore, if the bank were an FDIC insured institution, the giftor would not lose his assets if the bank failed.

Figure 2:
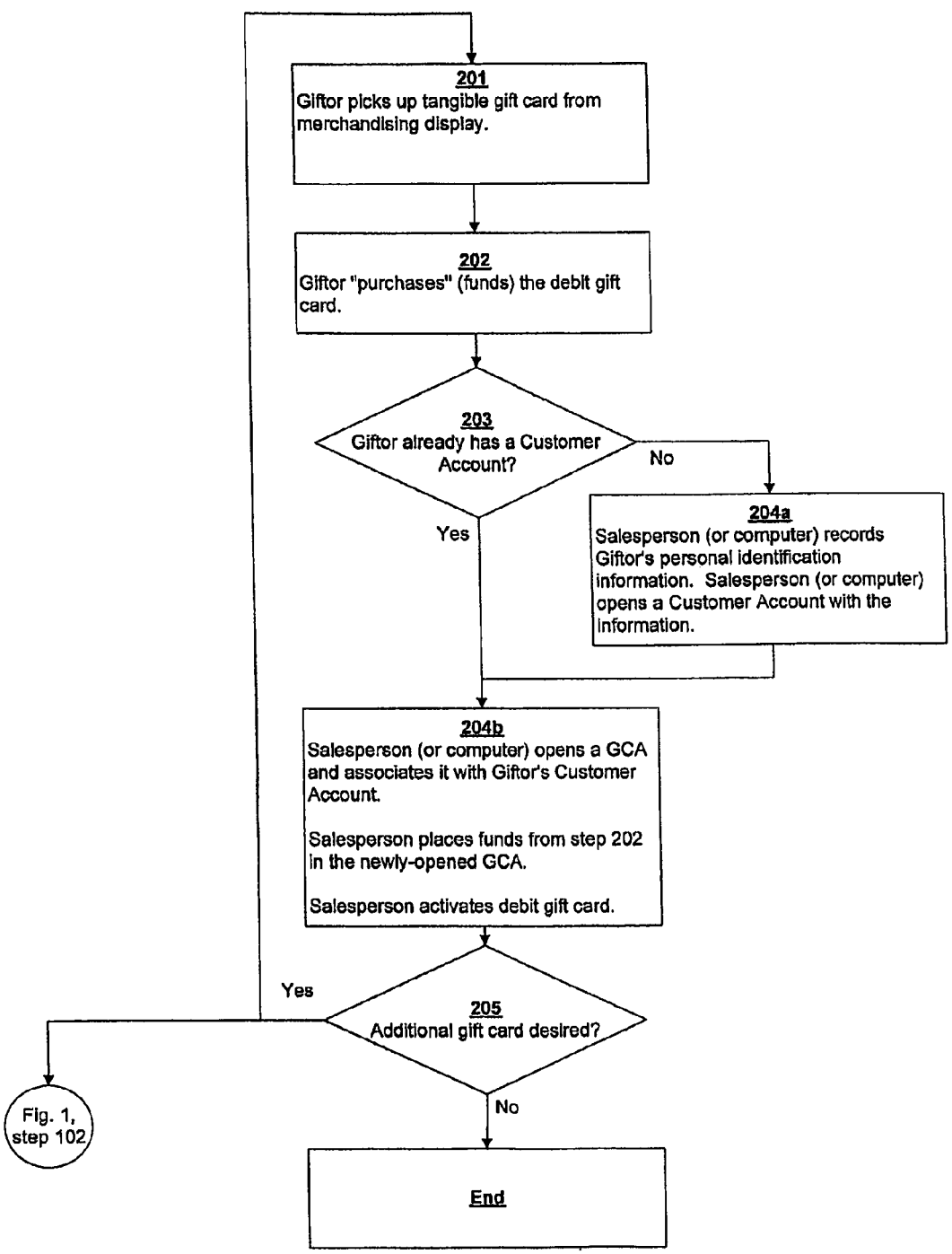
FIG. 2 is a flow diagram illustrating the issuance of a debit gift card where a giftor purchases and activates a debit gift card obtained from a merchandising display inside a store.

FIG. 2 is an illustration of an embodiment where the giftor picks up a tangible debit gift card from a merchandising display inside a store (or office) and opens a GCA and funds it by "purchasing" the debit gift card. That is, the giftor takes the debit gift card to a sales clerk and presents money to the sales clerk. The sales clerk will open a GCA on the giftor's behalf and deposit the giftor's money into the GCA. The clerk will also associate the GCA with the giftor's existing (or newly-created) Customer Account at a DGC Issuer. All of these steps can be integrated into one seamless transaction.

With reference to FIG. 2, a customer (giftor) will pick up a tangible gift card from a merchandising display in step 201. In this example, the giftor is inside a merchant's store and wants to "purchase" a closed-loop gift card that can only be used at this merchant. That is, the giftor wants to open a GCA, fund it, and receive a closed-loop gift card that can be used at this particular merchant.

The tangible gift card of this embodiment could be pre-printed or pre-programmed with a certain currency denomination, e.g. $50. Thus, if the giftor picked up a pre-printed $50 gift card, he could only fund the corresponding GCA with $50. Other tangible gift cards of this embodiment might not have a pre-printed or pre-programmed value and thus the giftor could fund the corresponding GCA with an arbitrary currency amount, e.g. $27.33.

At step 202, the giftor takes the tangible gift card to a cashier to "purchase" the gift card. That is, the giftor will present the cashier with a form of payment to fund the gift card. For example, the giftor could present the cashier with cash, a check, money order, credit or debit card, etc.

At step 203, the cashier (or a computer system) will determine if the giftor already has a Customer Account at the merchant. (In this example, the merchant maintains the Customer Accounts because it is also the DGC Issuer.) To determine if the giftor already has a Customer Account, the cashier could ask the giftor for his name, Customer Account number, or some other unique identifier such as a social security number, telephone number, or home address. Alternatively, if the giftor, in step 202, paid for the gift card using a credit card or debit card at a POS terminal, the POS computer system could read identifying information from the giftor's credit or debit card to look for a match in the merchant's Customer Account records.

Similarly, if the merchant had previously issued some sort of club membership card to the giftor, then the cashier could swipe the giftor's membership card through the POS terminal. Such membership cards are well-known in the retail industry and are often used by consumers to obtain discounts when purchasing items from a merchant. In addition, some DGC Issuers (including merchants who are their own DGC Issuers) provide their customers with Customer Account cards upon opening a Customer Account. Such Customer Account cards could be swiped through a POS terminal to identify the giftor's Customer Account.

If a giftor does not have an existing Customer Account, then the cashier will open a Customer Account for the giftor in step 204*a*. The giftor would need to provide the cashier (or a computer system) with his name and contact information such as home address or telephone number. Some merchants (acting as their own DGC Issuer) will require additional information such as a social security number, driver's license number, or other identifying information.

At step 204*b*, the cashier (or computer system) will open a GCA on the giftor's behalf at a partner financial institution. As described above, the giftor—not the merchant—will have ownership rights in the GCA. The cashier (or computer system) will then facilitate the transfer of the funds provided in step 202 to the newly-opened GCA at the partner financial institution. Finally, the cashier (or computer system) will "activate" the gift card that the giftor had picked up from the merchandising display by associating the gift card with the newly-opened GCA. After activation, the gift card can be used to debit funds from the GCA.

At step 205, the giftor can decide if he wants another closed-loop gift card for use at the same merchant. If so, he can pick up another card from the merchandising display and repeat steps 201-204*b*. The giftor could do so on a future date.

Alternatively, the giftor could follow steps 102-105 to remotely request an additional gift card. For instance, the giftor could telephone the merchant (DGC Issuer) and request an additional gift card be mailed to him. As another example, the giftor could access the merchant's website and request and additional gift card.

It will be recognized by those skilled in the art that debit gift cards could be issued to a giftor in a manner similar to FIG. 2 with some variations. For instance, a merchant might allow the giftor, in step 203, to choose a separate non-merchant DGC Issuer. In addition, the merchant might allow the giftor, in step 204b, to choose the financial institution where he wished to open his GCA.

Giftors will often prefer to open a Customer Account at a non-merchant DGC Issuer because they can then associate GCAs (and their attendant gift cards) from many different merchants with one Customer Account. That is, giftors will often not want to open a new Customer Account at each merchant where they desire to "purchase" a closed-loop gift card.

Giftors will also usually prefer to have their GCAs at a financial institution of their choosing. That way, giftors can maintain all their GCAs at an institution they trust. In addition, as described above in relation to FIG. 1, some giftors use their financial institution as their DGC Issuer.

In summary, embodiments of the invention can have different combinations of DGC Issuers, financial institutions, and merchants. A giftor could choose to use three separate entities for these functions: an "independent" DGC Issuer, a bank, and a merchant. Or the giftor could use the same financial institution as his DGC Issuer. Alternatively, the giftor could use the merchant as his DGC Issuer and maintain his GCAs at a separate financial institution(s).

In another embodiment, a giftor, after purchasing a tangible gift card in step 202, could take the inactivated gift card home with him. There, he could contact his preferred DGC Issuer (via telephone or internet, e.g.), provide the DGC Issuer with the account number pre-printed on the gift card, and request that the DGC Issuer "activate" the gift card. If the giftor did not already have a Customer Account with his chosen DGC Issuer, the issuer would open a Customer Account for him. The DGC Issuer would then open a new GCA at a financial institution on behalf of the giftor. Finally, the DGC Issuer would facilitate the transfer of the money used to "purchase" the gift card in step 202 from the merchant to the newly-opened GCA at the financial institution.

In another embodiment, a giftor could "purchase" an open-loop gift card in a manner similar to the steps outlined above in relation to FIG. 2. Typically, merchants who accept gift cards as payment will not want to issue open-loop gift cards that can be used at a competing merchant. However, a giftor could enter into a store (or office) maintained by a non-merchant DGC Issuer, pick up a tangible open-loop gift card from a merchandising display, and proceed to "purchase" the gift card as described above. This would be similar to the embodiment described above in relation to FIG. 1, except that the giftor would first pick up the tangible gift card from a merchandising display before proceeding to open and fund a GCA by "purchasing" the gift card.

Figure 3:
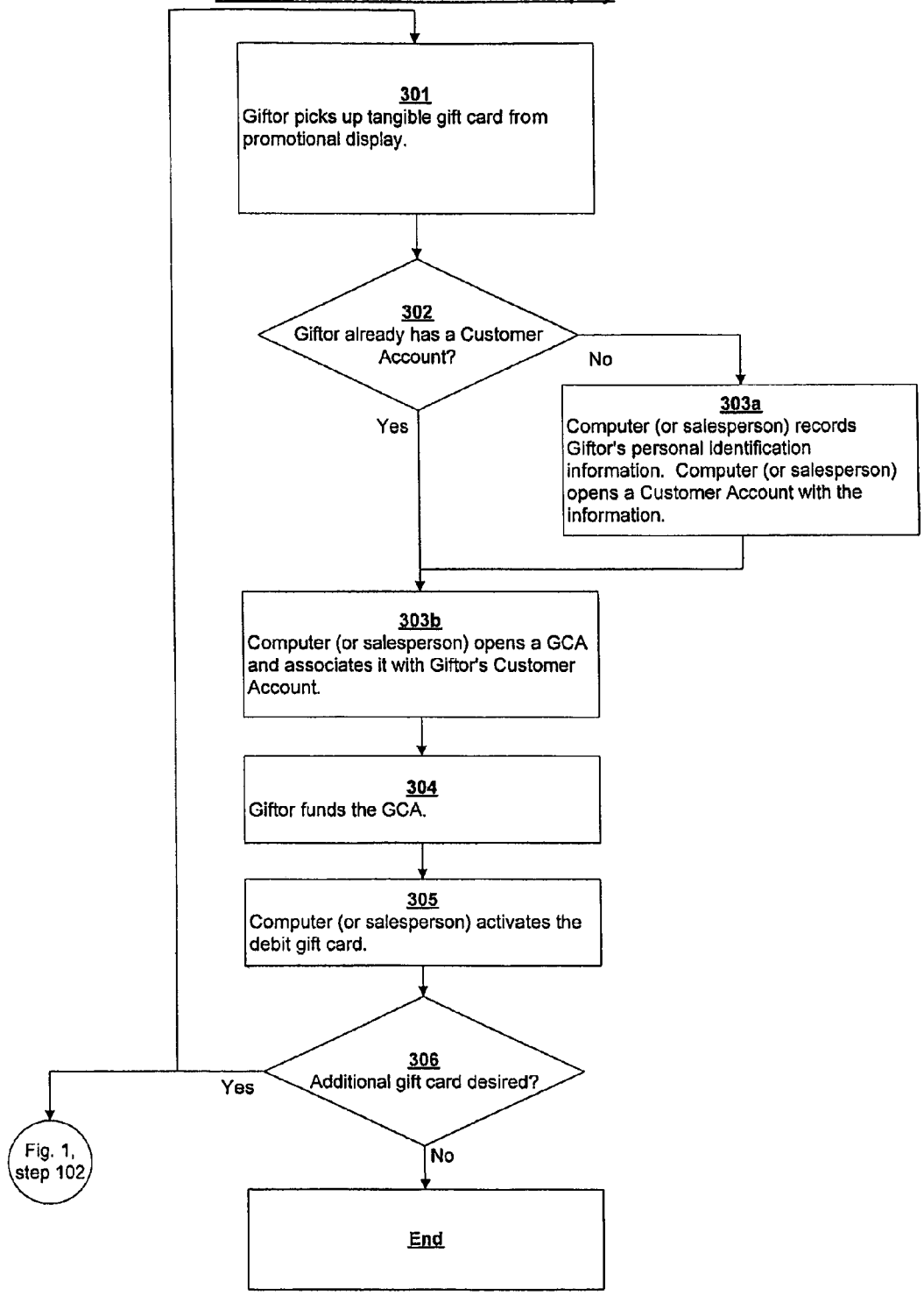
FIG. 3 is a flow diagram illustrating the issuance of a debit gift card where a giftor funds and activates a debit gift card obtained from a promotional display.

FIG. 3 shows an embodiment where the giftor picks up a tangible debit gift card from a promotional display and later activates the card by opening a GCA and funding it. That is, the giftor does not pay for the gift card before leaving the store. Such a promotional display could be located in a store or office, including those of a DGC Issuer, bank, or merchant. Alternatively, the promotional display could be located in a restaurant, bar, hotel, school, university, tourist information center, ticket selling booth, newspaper stand (manned or unmanned), vending machine, etc. Similarly, inactivated gift cards could be passed out on the street or mailed to the giftor's home. The main advantage of this embodiment is that the giftor can take the inactivated debit gift card with him without paying for it. That is, the giftor can simply pick up a tangible gift card, take it home with him, and decide at a later date if he wants to fund the gift card or not.

At step 301, the giftor will pick up a tangible debit gift card from a promotional display. The gift card could be a closed-loop or open-loop card. In some embodiments, the gift card will be pre-printed or pre-programmed with a certain currency denomination ($25, e.g.). The giftor need not pay for the tangible gift card immediately. Rather, he can take it with him and activate it at a later date. If the giftor later decided not to fund and activate the card, he could simply discard it.

If the giftor decides to activate the card, a representative (or computer system) of the DGC Issuer will determine if the giftor already has a Customer Account with the DGC Issuer at step 302. This could be done remotely via telephone, an internet website, fax, e-mail, postal mail, kiosk, etc. Alternatively, the giftor could visit a store or office of the DGC Issuer (or a partner of the DGC Issuer) and deal directly with a salesperson, ATM, or kiosk. If the giftor does not have a Customer Account, the DGC Issuer will open one for him at step 303a.

At step 303b, the salesperson (or computer system) will open a GCA and associate it with the giftor's Customer Account. The giftor will fund the GCA at step 304 using a suitable payment method such as cash, check, money order, ACH transaction, wire transfer, online payment system, or the like. As described above, certain embodiments of the invention will restrict the giftor to funding his GCA in certain increments or with certain currency denominations.

At step 305, the salesperson (or computer system) will activate the debit gift card by associating it with the newly-opened GCA. Thereafter, the debit gift card can be used to debit the GCA.

The giftor can decide, at step 306, whether he wants another gift card or not. If he does, he can pick up another gift card from the promotional display and repeat steps 301-305. Alternatively, he could contact (or visit) the DGC Issuer and follow steps 102-105 to order another gift card.

Those skilled in the art will recognize variations in the above described embodiments that come within the scope of the invention. For instance, a DGC Issuer could alter the order of some of the aforementioned steps. As an example, a salesperson could first activate a debit gift card before demanding payment from the giftor. Such a salesperson could subsequently deactivate the card if the giftor refused to tender payment. In another example, a kiosk could perform these steps in the following order: 1) demand payment from the giftor, 2) activate a gift card, and 3) open a GCA and deposit the giftor's funds therein.

Figure 4:
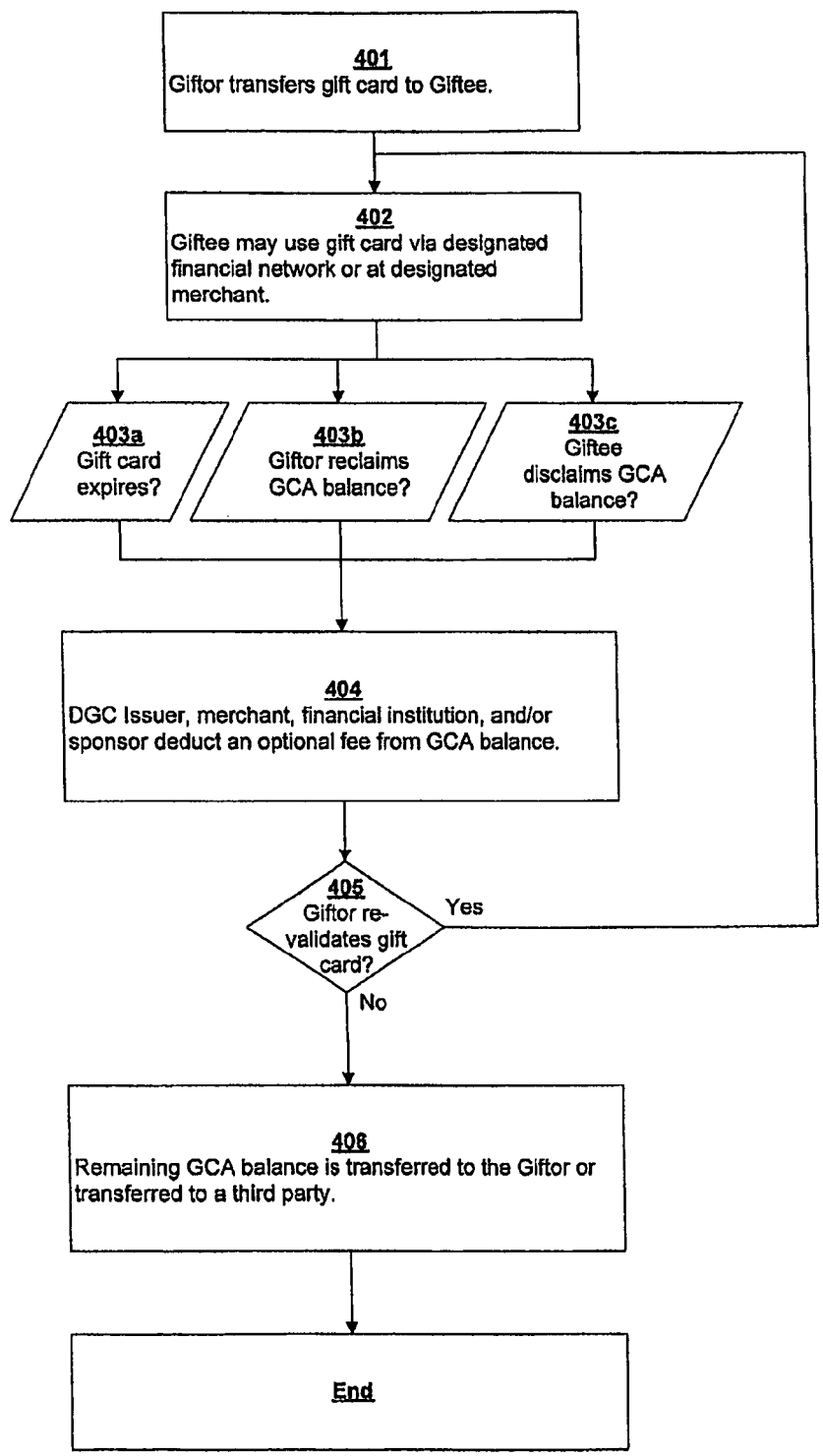
FIG. 4 is a flow diagram illustrating the use of a debit gift card in accordance with the invention.

FIG. 4 is a flow diagram illustrating the use of a gift card in accordance with the invention. At step 401, the giftor transfers the gift card to the giftee. If the gift card is embodied in a tangible object such as a plastic gift card or paper gift card, then the giftor can mail the card to the giftee or give the card in person. As discussed above, in some embodiments, the DGC Issuer will mail the tangible gift card directly to the giftee.

Alternatively, the giftor could communicate a "virtual" gift card account number (and any necessary PIN code) to the giftee. This would allow the giftee to use the intangible "virtual" gift card. Some issuers will associate a confidential PIN code with a given gift card as an added security feature. Like with a tangible gift card, the issuer of a "virtual" gift card could convey the gift card directly to the giftee by sending the giftee an e-mail, fax, postal mail letter, or communicating the account number by telephone or an internet web page.

In some embodiments, the GCA associated with a gift card will earn interest or dividends or otherwise accrue value on the balance therein. Such interest could remain in the GCA to be used by the giftee, sent to the giftor, or transmitted to a third-party.

At step 402, the giftee may use the debit gift card to purchase goods or services from an eligible merchant. For open-loop gift cards, the giftee can use the gift card at any merchant that participates in the financial network associated with the gift card. For closed-loop gift cards, the giftee must use the gift card at the particular merchant (or merchant chain) associated with the gift card. Use of the gift card will debit funds from the associated GCA. The giftee can use the gift card as long as there are funds in the GCA and the gift card has not expired or otherwise been invalidated.

Steps 403a, 403b, and 403c represent various "triggering events" that result in the invalidation of a particular gift card. Different embodiments may or may not have a particular triggering event. After a triggering event, any unused balance in the corresponding GCA can be transferred to some other account, as described more fully below.

Step 403a represents the expiration of a gift card. In most embodiments, this is the most common triggering event. As described above, however, not all gift cards have an expiration date. Once a gift card has expired, the giftee can no longer use the remaining funds in the associated GCA.

Step 403b represents the reclamation of the unused funds in a GCA. In various embodiments, the giftor could reclaim the funds by contacting the DGC Issuer, merchant, or financial institution that issued the card. Such reclamation could occur remotely (by telephone, internet, fax, ATM, kiosk, e-mail, etc.) or in person with a sales representative.

In some embodiments, the giftor can only reclaim funds after a given length of time. In some embodiments, the giftee must consent before the GCA funds can be reclaimed by the giftor.

A giftor might choose to reclaim funds if the giftee indicated that he did not want the gift or if the giftee never used the gift card. Likewise, if the gift card was lost or stolen, the giftor might choose to reclaim the funds. A giftor might also choose to reclaim the funds if he no longer wished the giftee to enjoy the benefit of the funds.

Step 403c represents the disclaimer of funds by the giftee. Like the reclamation process of step 403b, the giftee could disclaim the remaining funds in the GCA associated with his gift card by contacting the DGC Issuer, merchant, or financial institution that issued the card. Such a disclaimer could occur remotely (by telephone, internet, fax, ATM, kiosk, e-mail, etc.) or in person with a sales representative.

A giftee might choose to disclaim funds for a variety of reasons. If the gift card was a closed-loop card, the giftee might not desire any goods or services offered by the associated merchant. Alternatively, the giftee might think the gift was too extravagant and desire to return all or a portion of the gift to the giftor. In other cases, the giftee may dislike the giftor and not desire any gifts from the giftor. Finally, the giftee may choose to disclaim if the gift card is lost or stolen.

Step 404 represents the optional fees that may be levied upon GCAs following a triggering event. Such fees can be charged by the DGC Issuer, merchant, and/or financial institution that issued the gift card. Additionally, a person, organization, or company that promotes or sponsors the gift card could levy a fee upon the GCA balance. For instance, a church that sponsored a certain line of gift cards could receive 2% of the GCA balance of any gift card following a triggering event. Alternatively, a for-profit sponsoring company could levy such a fee.

In some embodiments, the giftor can, at step 405, choose to re-validate the gift card and leave the funds in the associated GCA so the giftee can continue using the gift card. For example, the giftor may decide to extend the expiration date of a gift card for another year.

Step 406 represents the transfer of the remaining GCA balance of a gift card out of the GCA following a triggering event. The GCA balance can be transferred into another financial account specified by the giftor. Alternatively, the GCA balance can be given to the giftor by check, cash, money order, or the like. In some embodiments, the giftor can choose to transfer the funds to a third-party (such as a church, civic group, or general creditor). In some embodiments, the giftor can choose to transfer the funds out of the GCA associated with an expired (or otherwise invalidated) gift card and into a GCA associated with an active gift card.

FIG. 5 is an illustration of a system in accordance with one embodiment of the invention. In this embodiment, the giftor has chosen an "independent" DGC Issuer 501 as his DGC Issuer. That is, the DGC Issuer 501 is neither a financial institution nor a merchant. The DGC Issuer 501 maintains its Customer Accounts in a database 508. Employees of the DGC Issuer 501 can manage the Customer Accounts through desktop computers 506 that interact with the DGC Issuer's servers 507.

The giftor can choose to open his Customer Account and request debit gift cards remotely through his own computer 515. The giftor's computer can communicate over the internet 505 with the DGC Issuer's website to perform the necessary steps outlined previously. Alternatively, the giftor can interact with the DGC Issuer 501 through a remote kiosk 517 or an on-site kiosk 516. Finally, the giftor can communicate with the DGC Issuer's salespeople in-person or over the telephone.

In this embodiment, the DGC Issuer 501 has not partnered with any particular financial institution and will allow the giftor to choose the bank (502, 503, 504, etc.) where he wants his GCA(s) to be held. The DGC Issuer's computer systems (506, 507, 508) can communicate with the computer systems (509-514) of the various banks (502, 503, 504). Thus, the giftor can seamlessly request and manage his gift cards (and their attendant GCAs) through the DGC Issuer 501. For example, the giftor can open and fund a GCA through one seamless transaction on the DGC Issuer's website. He can also view GCAs that he has opened in the past and whether the giftees have used the funds in the GCAs or not.

In this embodiment, the giftor can also manage his GCAs directly at the bank (502, e.g) where they are held. For instance, after opening a GCA through the DGC Issuer's website, the giftor could later view the balance at an ATM machine 518 at the bank 502 holding the GCA. As another example, the giftor could choose to deposit an additional $20 into a GCA (thereby making the funds available to his giftee) at the bank's remote ATM 519.

Accordingly, while the invention has been described with reference to the structures and processes disclosed, it is not confined to the details set forth, but is intended to cover such modifications or changes as may fall within the scope of the following claims.

I claim:

1. A method of facilitating the processing of debit gift card payment systems on behalf of a customer, the method comprising the steps of:

a) opening a customer account at an issuing entity utilizing an issuer computer system, wherein said customer account contains personal identification information of said customer including the name and address of said customer, wherein said customer account is not a financial account, wherein said issuing entity is neither a financial institution nor a merchant, wherein said issuer computer system is operated by said issuing entity, wherein said issuer computer system is remotely connected over a network to a customer computer operated by said customer, wherein said opening of said customer account is performed in response to a first electronic communication from said customer computer to said issuer computer system, and wherein said first electronic communication includes the name and address of the customer;

b) receiving, by said issuer computer system, a second electronic communication from said customer computer, wherein said second electronic communication includes a request to establish a Gift Card Account ("GCA") at a financial institution, wherein said second electronic communication includes an identifier for said financial institution, an identifier for a source account, a gift amount, and a name and address of a giftee, wherein said source account is a financial account containing a balance of readily available funds, and wherein said source account is not a credit account;

c) sending, by said issuer computer system to a financial computer system remotely connected over a network to the issuer computer system, a third electronic communication requesting the establishment of the GCA at the financial institution, wherein the third electronic communication includes the name and address of the customer, the gift amount, and the identifier for the source account;

d) opening the GCA at the financial institution on behalf of said customer by the financial computer system, wherein the GCA is a financial account owned by said customer, and wherein the GCA is not a credit account;

e) transferring funds, by said financial computer system, from said source account to said GCA in an amount equal to the gift amount, wherein said funds are readily available in said GCA after being properly cleared, and wherein the funds in said GCA are owned by the customer until the funds are debited from the GCA;

f) receiving, by said issuer computer system, a fourth electronic communication from the financial computer system confirming the establishment and funding of the GCA;

g) manufacturing a debit gift card by said issuing entity, wherein said debit gift card comprises a tangible computer-readable medium, wherein said debit gift card has encoded thereon GCA identification information uniquely associating said debit gift card with the GCA, wherein said debit gift card is adapted to be processed by point-of-sale terminals;

h) sending, by said issuing entity, the debit gift card to the giftee at the address of the giftee;

i) receiving, by said financial computer system, a fifth electronic communication from a point-of-sale terminal for a debit request from said GCA, wherein the fifth electronic communication was initiated in response to the debit gift card being swiped through said point-of-sale terminal;

j) verifying, by said financial computer system, that said GCA contains sufficient funds to cover said debit request;

k) debiting, by said financial computer system, an amount of funds from said GCA equal to said debit request, wherein said debited funds are readily available funds and not funds extended on credit;

l) receiving, by said issuer computer system, a reclamation request from said customer computer operated by said customer, wherein said reclamation request includes an identifier for said GCA and a destination account, wherein said destination account is owned by said customer but not affiliated with said debit gift card, and wherein said reclamation request is received prior to any expiration of said debit gift card;

m) relaying, by said issuer computer system, said reclamation request to said financial computer system;

n) verifying, by said financial computer system, that said GCA contains a positive balance; and o) transferring, by said financial computer system, funds from said GCA to said destination account.

2. A system for issuing debit gift cards comprising:
a customer computer operated by a customer;
an issuer computer system operated by an issuing entity, wherein said issuer computer system comprises at least one server and at least one database;
a financial computer system operated by a financial institution, wherein said financial computer system comprises at least one server and at least one database;
a first network connecting the customer computer to the issuer computer system; and
a second network connecting the issuer computer system to the financial computer system;
wherein the first network and the second network may be the same or different networks;
wherein the server of the issuer computer system is programmed to:
 a) open a customer account on behalf of said customer, wherein said customer account contains personal identification information of said customer including the name and address of said customer, wherein said customer account is not a financial account, wherein said issuing entity is neither a financial institution nor a merchant, wherein said opening of said customer account is performed in response to a first electronic communication from said customer computer to said issuer computer system, and wherein said first electronic communication includes the name and address of the customer;
 b) receive a second electronic communication from said customer computer, wherein said second electronic communication includes a request to establish a Gift Card Account ("GCA") at the financial institution, wherein said second electronic communication includes an identifier for the financial institution, an identifier for a source account, a gift amount, and a name and address of a giftee, wherein said source account is a financial account containing a balance of readily available funds, and wherein said source account is not a credit account; and
 c) send to the financial computer system a third electronic communication requesting the establishment of the GCA at the financial institution, wherein the third electronic communication includes the name and address of the customer, the gift amount, and the identifier for the source account;
wherein the server of the financial computer system is programmed to:

d) open the GCA at the financial institution on behalf of said customer, wherein the GCA is a financial account owned by said customer, and wherein the GCA is not a credit account; and e) transfer funds, by said financial computer system, from said source account to said GCA in an amount equal to the gift amount, wherein said funds are readily available in said GCA after being properly cleared, and wherein the funds in said GCA are owned by the customer until the funds are debited from the GCA;

wherein the server of the issuer computer system is further programmed to:

f) receive a fourth electronic communication from the financial computer system confirming the establishment and funding of the GCA;

wherein the issuing entity carries out the steps of:

g) manufacturing a debit gift card, wherein said debit gift card comprises a tangible computer-readable medium, wherein said debit gift card has encoded thereon GCA identification information uniquely associating said debit gift card with the GCA, wherein said debit gift card is adapted to be processed by point-of-sale terminals;

h) sending the debit gift card to the giftee at the address of the giftee;

and wherein the server of the financial computer system is further programmed to:

i) receive a fifth electronic communication from a point-of-sale terminal for a debit request from said GCA, wherein the fifth electronic communication was initiated in response to the debit gift card being swiped through said point-of-sale terminal;

j) verify that said GCA contains sufficient funds to cover said debit request; and k) debit an amount of funds from said GCA equal to said debit request, wherein said debited funds are readily available funds and not funds extended on credit;

wherein the server of the issuer computer system is further programmed to:

l) receive a reclamation request from said customer computer operated by said customer, wherein said reclamation request includes an identifier for said GCA and a destination account, wherein said destination account is owned by said customer but not affiliated with said debit gift card, and wherein said reclamation request is received prior to any expiration of said debit gift card;

m) relay said reclamation request to said financial computer system;

and wherein the server of the financial computer system is further programmed to:

n) verify that said GCA contains a positive balance; and o) transfer funds from said GCA to said destination account.

* * * * *